No. 813,864. PATENTED FEB. 27, 1906.
H. L. COIT.
DRILL CHUCK.
APPLICATION FILED SEPT. 3, 1904.
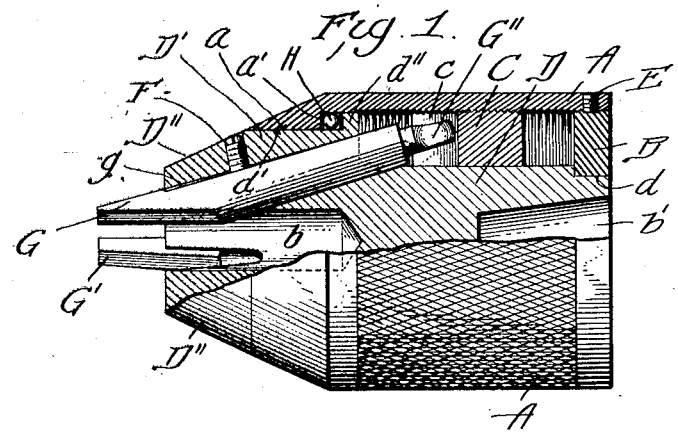
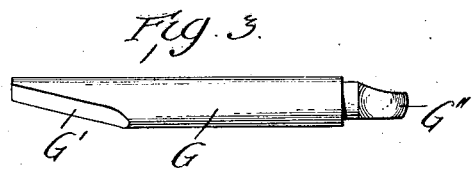
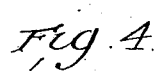 
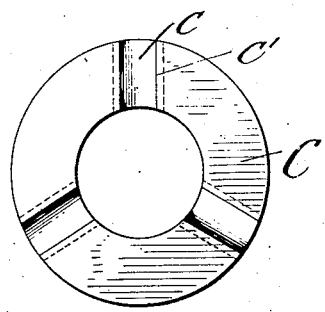 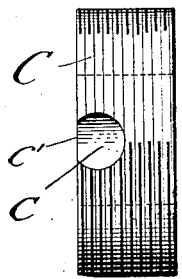
Attest:
C. J. Marleton
Edward L. Reed.
Inventor.
Harry L. Coit
By Spear, Middleton, Donaldson & Spear
Attys.

UNITED STATES PATENT OFFICE.

HARRY L. COIT, OF NEW LONDON, CONNECTICUT.

DRILL-CHUCK.

No. 813,864.     Specification of Letters Patent.     Patented Feb. 27, 1906.

Application filed September 3, 1904. Serial No. 223,130.

*To all whom it may concern:*

Be it known that I, HARRY L. COIT, a citizen of the United States, residing at New London, Connecticut, have invented certain new and useful Improvements in Drill-Chucks, of which the following is a specification.

My invention relates to drill-chucks; and its object is to provide a chuck that will be of simple construction in which the parts will not be easily disarranged and in which the friction will be reduced to a minimum; also, to provide a chuck from which the jaws may be removed and replaced without taking the chuck apart.

With these objects in view my invention consists of the construction hereinafter described, and more fully set forth in the claims.

In the accompanying drawings, Figure 1 is a longitudinal section of the chuck. Figs. 2 and 3 are detail views of one of the jaws. Figs. 4 and 5 are detail views of the traveling collar.

Referring to the drawings, D is the body or core of the chuck and is cylindrical in form, having at its rear end a reduced portion $d$ and at its front end an enlarged portion D', the forward end of this enlarged portion being tapered at D''. The core D is provided at each end with a recess $b$ $b'$ to receive the tool and the tool-handle or the mandrel, respectively. The guideways $g$ for the jaws G extend from the recess $b$ to the shoulder formed on the core D by the enlarged portion D'. For a portion of its length the enlarged part D' is turned down to a cylindrical form, as at $d'$, leaving a shoulder $d''$ on the inner edge thereof.

Surrounding the body D is a sleeve A, having its inner surface screw-threaded for a portion of its length and its outer surface knurled. The forward end of the sleeve is beveled to meet the taper D'' on the enlarged end of the body D and is provided with an inwardly-extending portion $a$, forming a shoulder $d''$. The end $a$ of the sleeve fits on the cylindrical part $d'$ of the enlarged portion of the body. The shoulders $d''$ of the part D' and $a'$ of the sleeve A face one another and form the ball-race for the ball-bearing H. Within the sleeve A and surrounding the cylindrical portion of the body D is a collar C, having its outer face threaded to mesh with the threads on the interior of the sleeve A and its inner face adapted to slide freely on the core D. In the forward side of the collar C are a series of recesses $c$, which are preferably in the form of cylindrical openings extending transversely through the collar near its edge and having an opening $c'$ through the side of the collar of slightly less diameter than the recess. The jaws G are preferably cylindrical in shape, having one end beveled, as at G', to form the gripping-face of the jaw and having the opposite end rounded to form a ball G'', which when placed within the recess C forms a ball-and-socket joint. To permit of the removal of the jaw without taking the chuck apart, the ball G'' is slightly flattened on its inner and outer faces, thus reducing the diameter of the ball sufficiently to allow it to pass through the opening $c'$ of the recess $c$. When the jaw is in position for use, the head G'' is turned so that its greatest diameter is across the opening $c'$, allowing the jaw perfect freedom of movement, but holding it securely in the socket. To remove the jaw, it is turned a quarter of a revolution to bring the narrow portion of the head in alinement with the opening, allowing the jaw to be withdrawn through the guideway $g$. The outer face of the jaw is flattened for a part of its length and the screw F provided to prevent it from turning, and at the same time allow it to slide freely in the guideway.

A washer or collar B is provided to close the end of chuck and to form the rear bearing for the sleeve A. The outer face of the washer is screw-threaded to fit in the end of the sleeve A and is secured in place by the screw E passing through the sleeve. The opening in the washer is of a size to permit it to fit over the reduced part $d$ of the body D and to turn freely thereon.

In operation the chuck is held by the tool-handle or mandrel, inserted at $b'$, and the sleeve A revolved. As the sleeve revolves the threads on its inner face engage the threads on the collar C and move the collar forward or backward, according to the direction in which the sleeve is revolved, and the collar of course carries the jaws with it, forcing them in or out and open or shut.

Owing to the small surface of the bearing parts and the ball-bearing H the friction is greatly reduced and the operation of the chuck is made very easy.

Having described my invention, what I claim is—

1. A drill-chuck comprising a core, an enlarged portion at one end of said core, oblique openings through said enlarged portion, a sleeve surrounding said core, a collar surrounding said core within said sleeve and adapted to move lengthwise thereof, said collar having cylindrical openings extending transversely therethrough and openings extending through the face of said collar into said cylindrical openings of less diameter than said cylindrical openings, jaws circular in cross-section extending through said openings in the enlarged portion of said core and substantially disk-shaped heads on the inner ends of said jaws, said heads being adapted to enter the openings in the face of said collar when turned to a position parallel therewith, substantially as described.

2. A drill-chuck comprising a core, an enlarged portion at one end of said core, oblique openings through said enlarged portion, a sleeve surrounding said core, a collar surrounding said core within said sleeve and adapted to move lengthwise thereof, said collar having cylindrical openings extending transversely therethrough and openings extending through the face of said collar into said cylindrical openings of less diameter than said cylindrical openings, jaws circular in cross-section extending through said openings in the enlarged portion of said core and substantially disk-shaped heads on the inner ends, of said jaws, said heads being adapted to enter the openings in the face of said collar when turned to a position parallel therewith and means for preventing said jaws from being turned, substantially as described.

In testimony whereof I affix my signature in presence of two witnesses.

HARRY L. COIT.

Witnesses:
  M. WILSON DART,
  HORACE R. GARDNER, Jr.